(12) United States Patent
Cheng et al.

(10) Patent No.: US 11,128,617 B2
(45) Date of Patent: Sep. 21, 2021

(54) TOKEN BASED SECURE MULTIPARTY COMPUTING FRAMEWORK USING A RESTRICTED OPERATING ENVIRONMENT

(71) Applicant: Baidu USA LLC, Sunnyvale, CA (US)

(72) Inventors: Yueqiang Cheng, Sunnyvale, CA (US); Yulong Zhang, Sunnyvale, CA (US); Yu Ding, Sunnyvale, CA (US); Tao Wei, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 294 days.

(21) Appl. No.: 16/264,512

(22) Filed: Jan. 31, 2019

(65) Prior Publication Data
US 2020/0252393 A1    Aug. 6, 2020

(51) Int. Cl.
*H04L 29/06*        (2006.01)
(52) U.S. Cl.
CPC .................... *H04L 63/0853* (2013.01)
(58) Field of Classification Search
None
See application file for complete search history.

(56) References Cited

U.S. PATENT DOCUMENTS

2012/0209778 A1*  8/2012  Delany ............... H04L 63/0442 705/75
2018/0336554 A1*  11/2018  Trotter ................ H04L 63/0853

\* cited by examiner

*Primary Examiner* — Cai Y Chen
(74) *Attorney, Agent, or Firm* — Womble Bond Dickinson (US) LLP

(57) ABSTRACT

According to one embodiment, in response to a request received at a host agent of a server from a user device of a user over a network to process user data, a system transmits a token representing the request to an executor pool having a pool of a number of executors. The system receives by the host agent executable image(s) of an executor from the executor pool, where the executor pool allocated the executor from the pool of executors in response to successfully verifying the token. The system launches a restricted operating environment within the server, including providing the executable image(s) of the executor and the user data to the restricted operating environment. The system executes the executable image(s) of the executor within the restricted operating environment, where the executor, when executed, is to process the user data without accessing an external component external to the restricted operating environment.

21 Claims, 8 Drawing Sheets

TOKEN BASED SECURE MULTIPARTY COMPUTING FRAMEWORK USING A RESTRICTED OPERATING ENVIRONMENT

TECHNICAL FIELD

Embodiments of the invention relate generally to secure multiparty computing. More particularly, embodiments of the invention relate to a token based secure multiparty computing framework using a restricted operating environment.

BACKGROUND

Sensitive transactions are increasingly being performed by cloud based servers. Cloud-based is a term that refers to applications, services or resources made available to users on demand via the Internet from cloud servers. The multi-party or multitenant nature of cloud based servers has an increasing need for securing a multitenant computing environment from unauthorized accesses by untrusted parties. For example, during computation, data from one party may be accessible by untrusted parties. Thus, there is a need to secure data during computation. Furthermore, cryptographic based multiparty computation solutions are slow and thus may not be practical.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
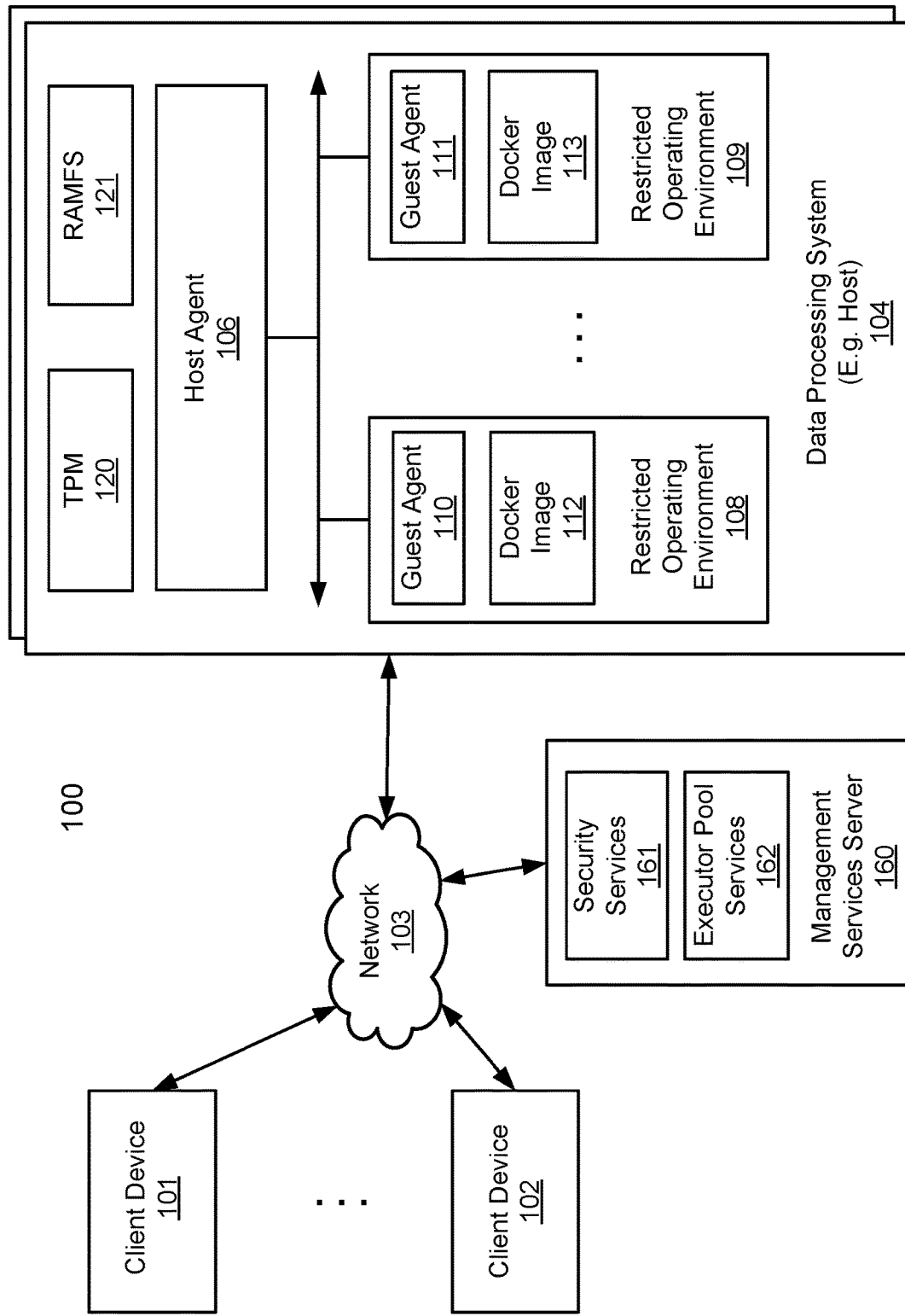
FIG. 1 is a block diagram illustrating an example of system configuration for a computing framework for secure multiparty computation using a guest agent according to one embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure prevent data of a client from leaking to untrusted parties in a multiparty computation environment. According to a first aspect of the disclosure, in response to a request received at a host agent of a server from a user device of a user over a network to process user data, a data processing system launches a restricted operating environment within the server. The system transmits a token representing the request to a guest agent executed within the restricted operating environment, where an executor associated with the token is launched by the guest agent within the restricted operating environment, where the executor, when executed, is configured to process the user data to generate a processing result without accessing an external component external to the restricted operating environment. The system returns the processing result back to the user device. In another embodiment, one or more executors are launched by the system.

According to a second aspect, in response to a request received at a host agent of a server from a user device of a user over a network to process user data, a system transmits a token representing the request to an executor pool having a pool of a number of executors. The system receives by the host agent one or more executable images of an executor from the executor pool, where the executor pool allocated the executor from the pool of executors in response to successfully verifying the token. The system launches a restricted operating environment within the server, including providing the one or more executable images of the executor and the user data to the restricted operating environment. The system executes the one or more executable images of the executor within the restricted operating environment, where the executor, when executed, is configured to process the user data without accessing an external component external to the restricted operating environment. In another embodiment, one or more executors are launched by the system.

FIG. 1 is a block diagram illustrating an example of system configuration for a computing framework for secure multiparty computation using a guest agent according to one embodiment. Referring to FIG. 1, system configuration 100 includes, but is not limited to, one or more client devices 101-102 communicatively coupled to data processing server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless. The communication between client devices 101-102, data processing server 104, and management services server 160 over network 103 can be secured, e.g., via TLS/SSL.

Data processing server (e.g., host) 104 may be any kind of servers or a cluster of servers, such as Web or cloud servers, application servers, backend servers, or a combination thereof. Server 104 can include an interface to allow a client such as client devices 101-102 to access resources or services provided by server 104 or management services server 160. For example, server 104 may be a cloud server or a server of a data center that provides a variety of cloud services to clients, such as, for example, cloud storage, cloud computing services, big data services, modeling services, machine-learning training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

Data processing server 104 can include RAM disk file system (ramfs) 121 and one or more CPU(s) (not shown) equipped with a security module, such as a trusted platform module (TPM) 120, for secure boot. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot for server 104 so an operating system of server 104 can be trusted.

Data processing server 104 can include host agent 106 and one or more restricted operating environments 108-109. The host agent can communicates with client devices 101-102 to facilitate client requests. The host agent 106 can launch restricted operating environments, such as environments 108-109, to execute data processing computations for different clients and/or client requests. Here, restricted operating environments are sandboxed operating environments which are isolated from each other and from the operating system of server 104 which they are operating on. An example of a restricted operating environment is a Docker container. A Docker container is a program that performs an operating system level virtualization. The Docker container is a standalone software executable to run an application in an isolated environment.

In one embodiment, restricted operating environments 108-109 can include guest agents 110-111 and Docker images 112-113 (e.g., Docker container programs). A guest agent is an application which runs within a Docker container to serve user requests. Guest agents 110-111 can communicate with management services server 160 to verify client requests and to retrieve executor scripts/images for execution. Guest agents 110-111 can also communicate with host agent 106 to receive token information and client data. Lastly, guest agents 110-111 can initiate and/or monitor data processing computations within the restricted operating environment and can communicate with host agent 106 to indicate to host agent 106 that a computation or execution has complete.

Management services server 160 may be any kind of server. Server 160 can include an interface (e.g., API or CLI) to allow data processing server 104 to access management services provided by server 160. The provided management services can include services to manage and audit clients and their execution requests. Example management services provided by server 160 include security services 161 and executors pool services 162. Security services 161 include services to issue and verify tokens for client requests. Executors pool services include services to provide a pool of executors/software executables/codes to server 104 to serve client requests. An example of an executor is a code scanner to look for software bugs for a software code provided by a client request. Although shown as a single server, in some embodiments, management services server 160 may represent many servers. For example, security services 161 may be provided by one server and executors pool services 162 may be provided by many servers from different departments of an organization where a software image/code can be sourced. In another embodiment, management services server 160 and data processing server 104 is a single integrated server.

Figure 2:
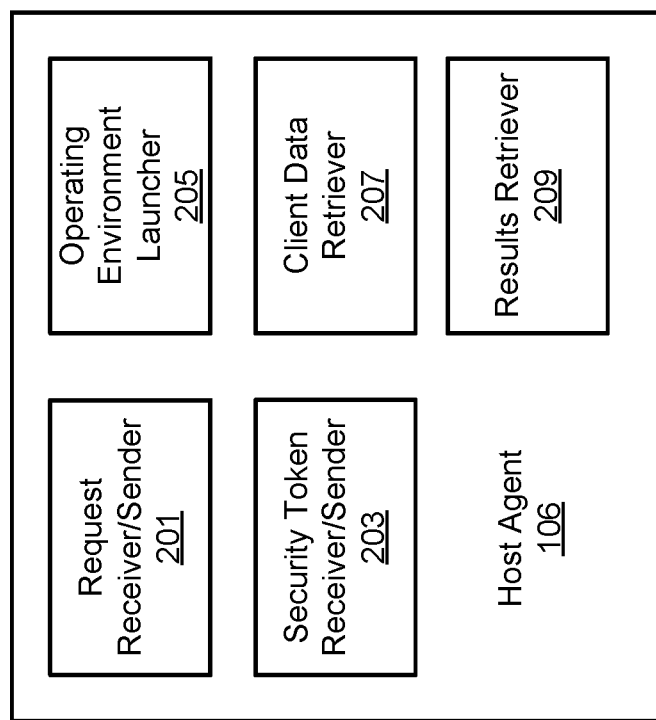
FIG. 2 is a block diagram illustrating an example of a host agent according to one embodiment.

FIG. 2 is a block diagram illustrating an example of a host agent according to one embodiment. Host agent 106 can be an application agent that is dedicated to service client requests for host server 104. In one embodiment, host agent 106 includes request receiver/sender 201, security token receiver/sender 203, operating environment launcher 205, client data retriever 207, results retriever 209. Request receiver/sender 201 can receive a client request from a client and send or forward the request to a guest agent of a restricted operating environment. Security token receiver/sender 203 can receive a security token corresponding to a client request from management services and can send the security token to a guest agent of a restricted operating environment. Operating environment launcher 205 can launch different restricted operating environments for server 104, where each restricted operating environment correspond to a client and/or a client execution request. Client data retriever 207 can retrieve client data from a client device. Results retriever 209 can retrieve the results for a complete execution. Results retriever 209 can also send the results to the requesting client device of a client.

Figure 3:
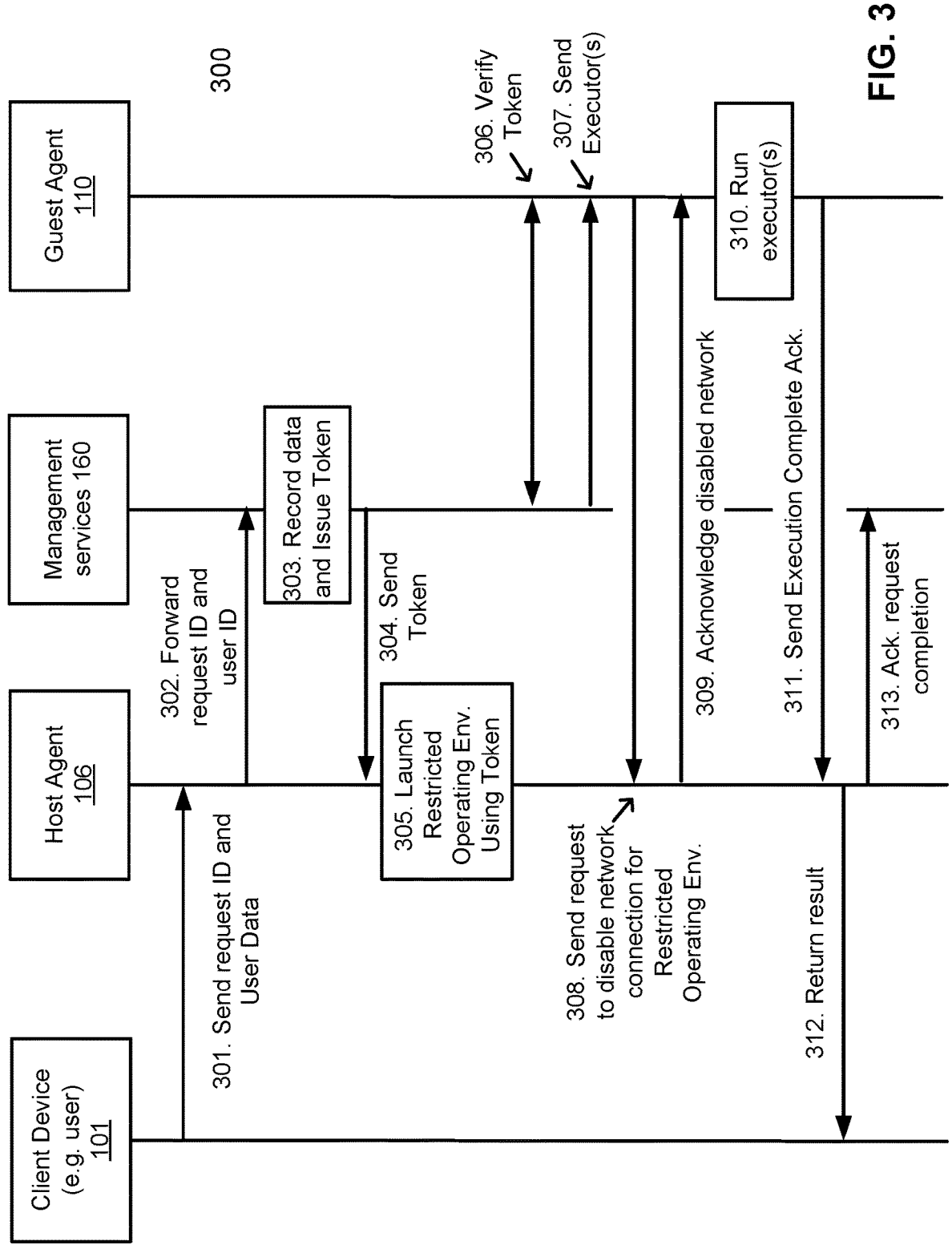
FIG. 3 is a flow chart illustrating an example of a secure multiparty computation protocol according to one embodiment.

FIG. 3 is a flow chart illustrating an example of a secure multiparty computation protocol according to one embodiment. Referring to FIG. 3, operations 300 for the protocol may be performed by system 100 of FIG. 1. In one embodiment, host agent 106 disables page swap for ramfs 121. In one embodiment, at operation 301, client device (e.g., a client/user) 101 sends a request by identifier (ID) and client data to host agent 106. The request can be a request for resources or services (such as a request for big data analysis, modeling, machine learning/training tasks, etc.). The client data can include a client ID and an input data to service the client request. In response to receiving the request, host agent 106 saves the request and any received data within a ramfs, such as RAMFS 121 of server 104 of FIG. 1 (such as c:\ drive). At operation 302, host agent 106 sends the request ID and the user ID corresponding to the client device to management services 160 (e.g., security services 161). At operation 303, management services 160 (e.g., security services 161) records the client ID and the request ID in a database and issues one or more tokens/keys for the request. At operation 304, management services 160 (e.g., security services 161) transmits the token(s) to host agent 106. In one embodiment, the token/key(s) can be a random sequence value uniquely identifying the particular client request. The random sequence value can be generated by a random number generator. In another embodiment, the token can uniquely identify the client request with respect to an executor (e.g., many tokens may be issued for a client request if the client request invokes many executors). Here, management services has a record of, and can identify, the particular executors required to complete the request to issue the corresponding tokens accordingly.

At operation 305, host agent 106 launches a restricted operating environment (or Docker container) (e.g., restricted operating environment 108 of FIG. 1) by launching a trusted Docker image together with the token(s) and/or any client input data. In one embodiment, launching the Docker image initiates a guest agent (e.g., guest agent 110). In one embodiment, host agent 106 sends the token(s)/input data to guest agent 110 within the restricted operating environment (or Docker container) for a data processing execution. In another embodiment, host agent 106 places the token(s)/input data onto the ramfs that is allocated to the Docker container for the guest agent 110 to fetch the data, such that the data need not be copied over to the Docker image.

At operation 306, guest agent 110 sends the token(s) to management services 160 (e.g., executors pool services 162) to be verified. In one embodiment, executors pool services 162 communicates with security services 161 to verify the token(s) are valid and matching. The verification includes verifying the user ID and the request ID match a user ID and a request ID associated with the token ID. Once verified/authenticated, executors pool services 162 communicates the verification results to guest agent 110. At operation 307, management services 160 (e.g., executors pool services 162) sends one or more executable images for executor(s) associated with the client request to guest agent 110. Guest agent 110 receives the executable images of the executor(s) and continues to service the client request. In one embodiment, management services 160 (e.g., executors pool services 162) may gather the executor(s) from other departments of an organization. Once gathered, management services 160 (e.g., executors pool services 162) then sends the executor(s) to guest agent 110. Although management services 160 is depicted as a single module, management services 160 can include a server for security services 161 and one or more servers for executors pool services 162, where the executors pool services 162 are in communication with security services 161 for the issued tokens. In one embodiment, management services server 160 can also be integrated with data processing server 104.

At operation 308, guest agent 110 sends a request to host agent 106 to disable any network connections to the Docker container to isolate the Docker container. At operation 309, guest agent 110 receives acknowledgement for the disabling of the network connections. At operation 310, guest agent 110 initiates/runs data processing execution/computation to service the client request by launching the executors. Because the Docker container is isolated from the network and is a standalone unit, the Docker container is isolated and is secure from untrusted parties. Guest agent 110 can monitor (or poll) the execution until completion. In one embodiment, when execution completes, execution results can be deposited onto a predetermined memory location or ramfs location (e.g., RAMFS 121 of FIG. 1) associated with the Docker container. Here, an operating system of server 104 can allot a memory or ramfs for the launched Docker container, where host agent 106 can keep track of the allotted memory or ramfs. At operation 311, guest agent 110 sends an execution completion acknowledgement to host agent 106. At operation 312, in response to receiving the completion acknowledgement, host agent 106 retrieves the execution results from the predetermined location on memory or ramfs and returns the results to client device 101 through a secure communication channel, e.g., TLS/SSL. Host agent 106 can then terminate the Docker container without affecting the execution results, e.g., execution results are still on a memory and/or ramfs location managed by host agent 106. In one embodiment, at operation 313, host agent 106 sends a completion acknowledgement to management services server 160 for recording keeping/auditing purposes. In summary, management services server(s) (e.g., server(s) for security services and executors pool services) never accesses client data for client requests and execution of client requests within restricted operating environments ensures the client data is isolated and is secured from untrusted parties.

Figure 4:
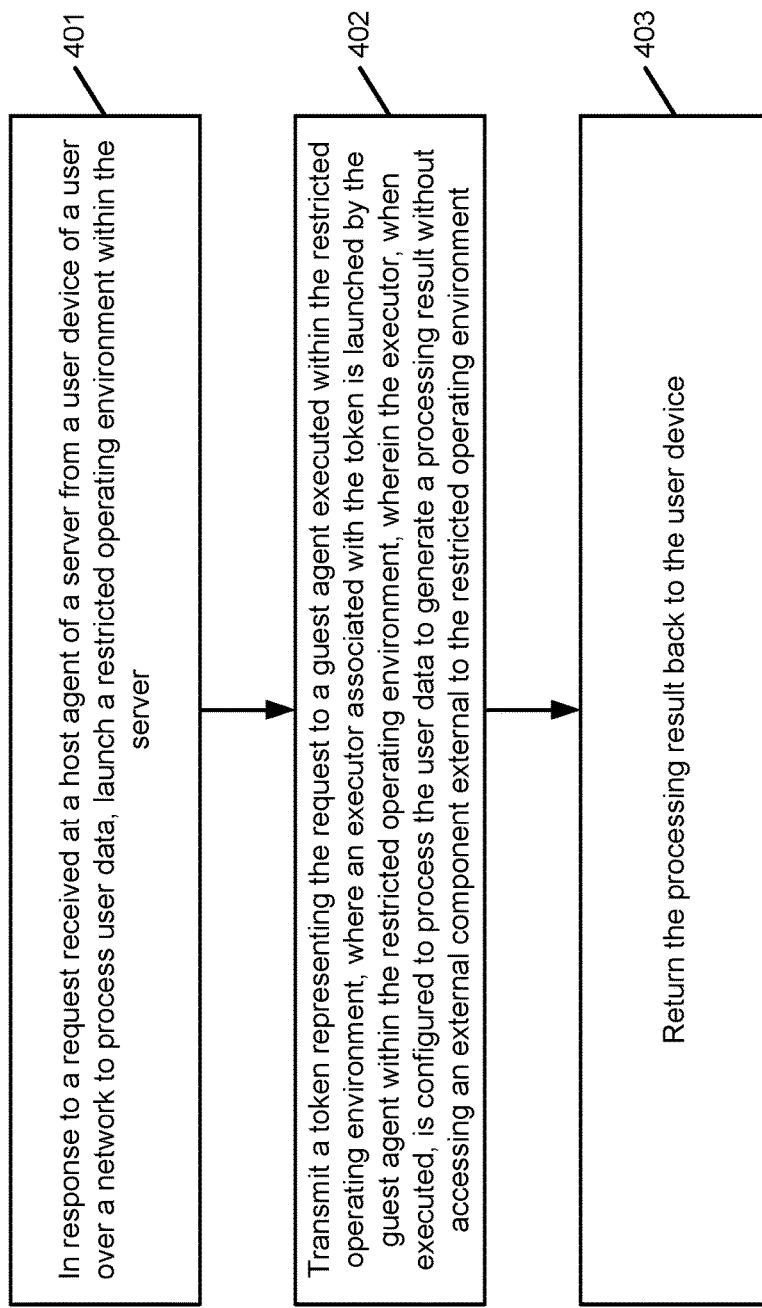
FIG. 4 is a flow diagram illustrating an example of a method according to one embodiment.

FIG. 4 is a flow diagram illustrating an example of a method according to one embodiment. Process 400 may be performed by processing logic which may include software, hardware, or a combination thereof. For example, process 400 may be performed by data processing server (e.g., host) 104 of FIG. 1. Referring to FIG. 4, at block 401, in response to a request received at a host agent of a server from a user device of a user over a network to process user data, processing logic launches a restricted operating environment within the server. At block 402, processing logic transmits a token representing the request to a guest agent executed within the restricted operating environment, where an executor associated with the token is launched by the guest agent within the restricted operating environment, where the executor, when executed, is configured to process the user data to generate a processing result without accessing an external component external to the restricted operating environment. At block 403, processing logic returns the processing result back to the user device.

In one embodiment, the request is one of a number of requests received from a number of user devices associated with a number of users, and where each of the requests is processed within a respective one of a number of restricted operating environments. In one embodiment, processing logic further transmits a request identifier (ID) associated with the request and a user ID associated with the user from the host agent to a management service, and receives the token associated with the request from the management service in response to the request ID and the user ID.

In another embodiment, the management service registers the request ID and the user ID and generates the token to represent a service session associated with the request ID and the user ID. In another embodiment, in response to receiving the token, processing logic further transmits by the guest agent the token to the management service to verify the request and receives an one or more executable images of the executor from the management service in response to successfully verifying the request based on the token, where the executor is launched by executing the one or more executable images within the restricted operating environment.

In another embodiment, the management service is to examine the token to determine whether the token is associated with the request ID and the user ID previously registered by the host agent. In another embodiment, the management service is to allocate the executor from a pool of executor candidates and to return the allocated executor to the guest agent, such that the guest agent can launch the executor within the restricted operating environment.

In another embodiment, the guest agent is to further disable a network interface of the restricted operating environment, such that the executor cannot access the external component during processing of the user data. In another embodiment, processing logic further transmits the user data to the guest agent executed within the restricted operating environment or transmits an indication of availability of the user data to the guest agent so the user data can be fetched by the guest agent.

In one embodiment, the executor is to store the processing result in a predetermined memory location accessible by the host agent, and where the host agent is configured to retrieve the processing result from the predetermined memory location to return the processing result back to the user device. In one embodiment, processing logic further terminates the restricted operating environment without effects to the processing result at the predetermined memory location.

Figure 5:
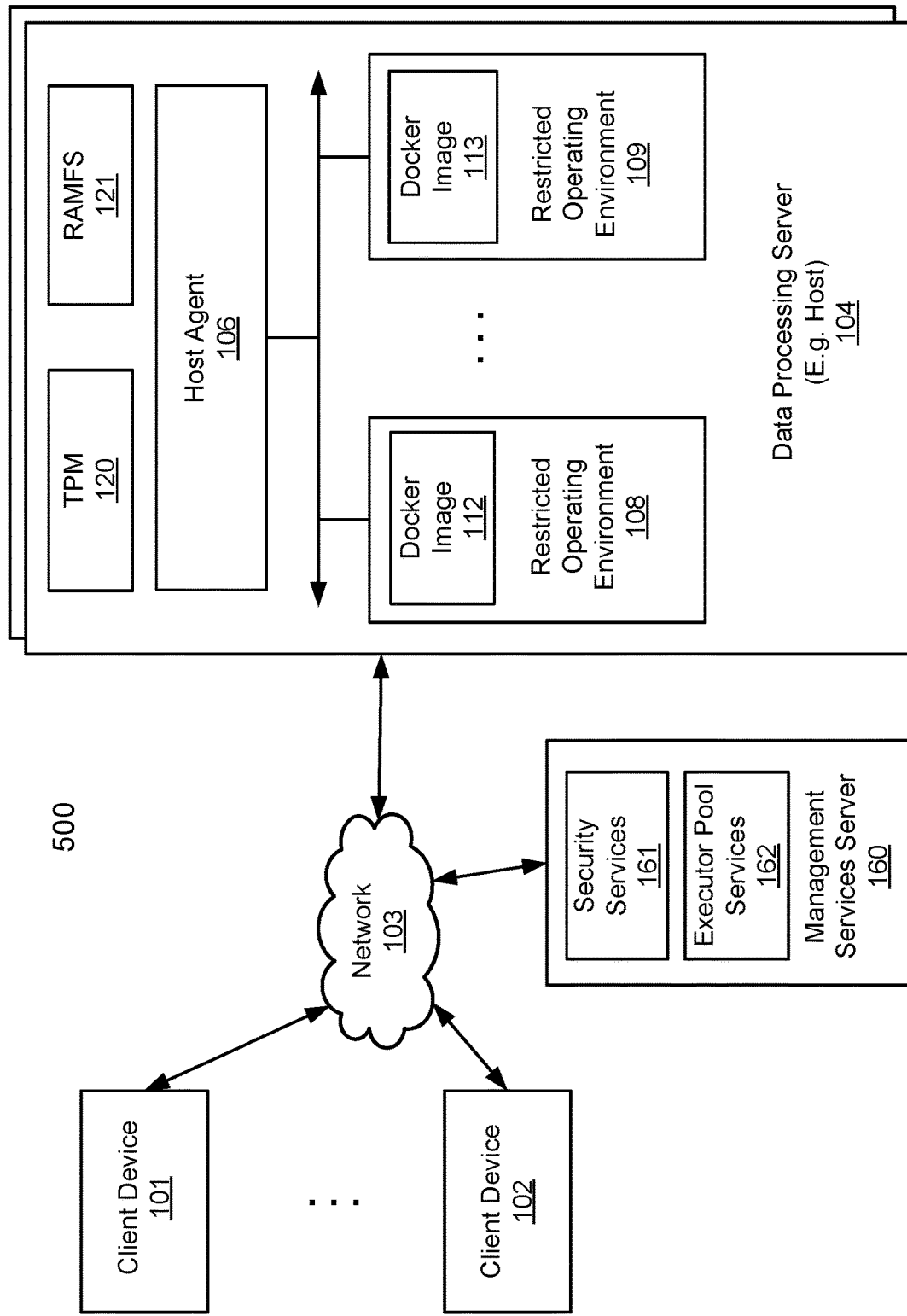
FIG. 5 is a block diagram illustrating an example of system configuration for a token based computing framework for secure multiparty computation according to one embodiment.

FIG. 5 is a block diagram illustrating an example of system configuration for a token based computing framework for secure multiparty computation according to one embodiment. System 500 of FIG. 5 is similar to system 100 of FIG. 1 except launching restricting operating environments 108-109 do not initiate guest agents 110-111 of FIG. 1. Thereafter, the restricting operating environments can automatically start execution and would terminate when execution completes. Host agent 106 can then detect an execution completion via an event callback when an execution completes and/or a restricting operating environment terminates.

Figure 6:
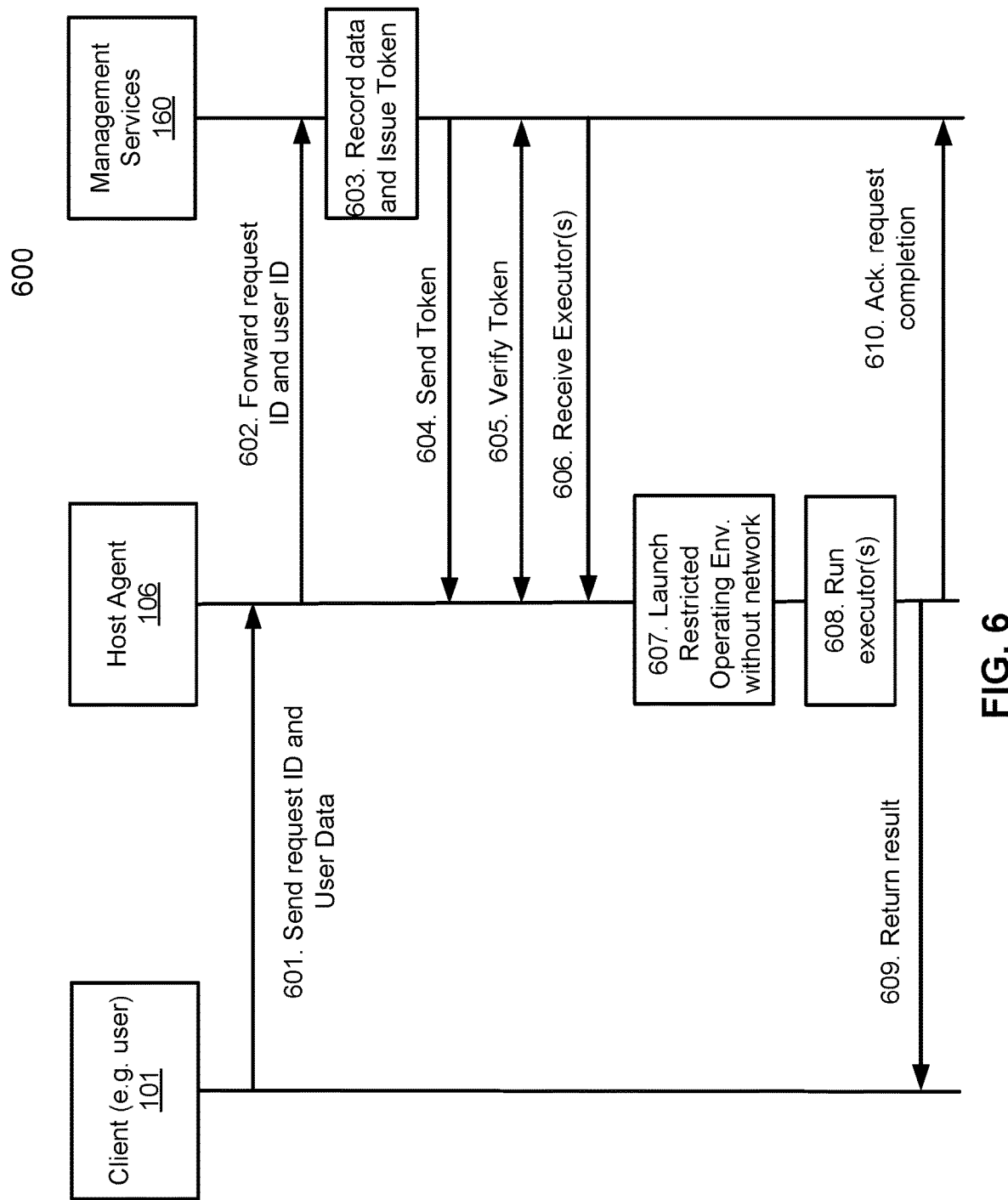
FIG. 6 is a flow chart illustrating an example of a secure multiparty computation protocol according to one embodiment.

FIG. 6 is a flow chart illustrating an example of a secure multiparty computation protocol according to one embodiment. Referring to FIG. 6, operations 600 for the protocol may be performed by system 500 of FIG. 5. In one embodiment, host agent 106 disables page swap for ramfs 121. In one embodiment, at operation 601, client device (e.g., a client/user) 101 sends a request by a request identifier (ID) and client data to host agent 106. The request can be a request for resources or services (such as a request for big data analysis, modeling, machine learning/training tasks, etc.). In response to receiving the request, host agent 106 saves the received request ID, client ID, and input data within a ramfs, such as RAMFS 121 of server 104 of FIG. 5. At operation 602, host agent 106 sends the request ID and the user ID corresponding to the client device to management services 160 (e.g., security services 161). At operation 603, management services 160 (e.g., security services 161) records the client ID and the request ID onto a database and issues one or more token(s)/key(s) for the request ID. At operation 604, management services 160 (e.g., security services 161) transmits the token(s) to host agent 106. In one embodiment, the token/key(s) can be a random sequence value uniquely identifying the particular client request. The random sequence value can be generated by a random number generator. In another embodiment, the token can uniquely identify the client request with respect to an executor (e.g., many tokens may be issued for a client request if the client request invokes many executors). Here, management services has a record of and can identify the particular executors required to complete the request to issue the corresponding tokens accordingly.

At operation 605, guest agent 110 sends the token(s) to management services 160 (e.g., executors pool services 162) to be verified. In one embodiment, executors pool services 162 communicates with security services 161 to verify the token(s) are valid and matching. Once verified/authenticated, at operation 606, management services 160 (e.g., executors pool services 162) sends the executor(s) associated with the client request to host agent 106. Host agent 106 receives the executor(s) and continues to service the client request. In one embodiment, management services 160 (e.g., executors pool services 162) may gather the executor(s) for execution from other departments of an organization. Once gathered, management services 160 (e.g., executors pool services 162) then sends the executor(s) to guest agent 110. Although management services 160 is depicted as a standalone module, management services 160 can include a server for security services 161 and one or more servers for executors pool services 162, where the executors pool services 162 are in communication with security services 161 to track any issued tokens. Management services 160 can also be integrated with data processing server 104.

At operation 607, host agent 106 launches a restricted operating environment (or Docker container) (e.g., restricted operating environment 108 of FIG. 5) by launching a trusted Docker image together with the received executor(s) and/or any client data (e.g., input data). Note that the executor(s) or executor image(s) and client data are passed through ramfs. The restricted operating environment has ramfs as its filesystem. Furthermore, the restricted operating environment has no other channels to leak information to a storage disk of server 104. At operation 608, in one embodiment, executor(s) automatically executes/runs when the restricted operating environment boots up. When the executor completes the execution, the Docker image would terminate automatically, via a script within the restricted operating environment. Note that the restricted operating environment does not have a network connection, and thus client data would not leak out of the restricted operating environment.

Upon termination of the Docker image, in one embodiment, host agent 106 receives a callback event that an execution is complete and an execution result is ready. At operation 609, host agent 106 retrieves the execution result from the predetermined location on memory or ramfs and returns the results to client device 101 through a secure communication channel, e.g., TLS/SSL. In one embodiment, at operation 611, host agent 106 sends a completion acknowledgement to management services server 160 for recording keeping/auditing purposes. In summary, management services server(s) (e.g., server(s) for security services and executors pool services) never accesses client data for client requests and execution of client requests within restricted operating environments ensures the client data is isolated and is secured from untrusted parties.

Figure 7:
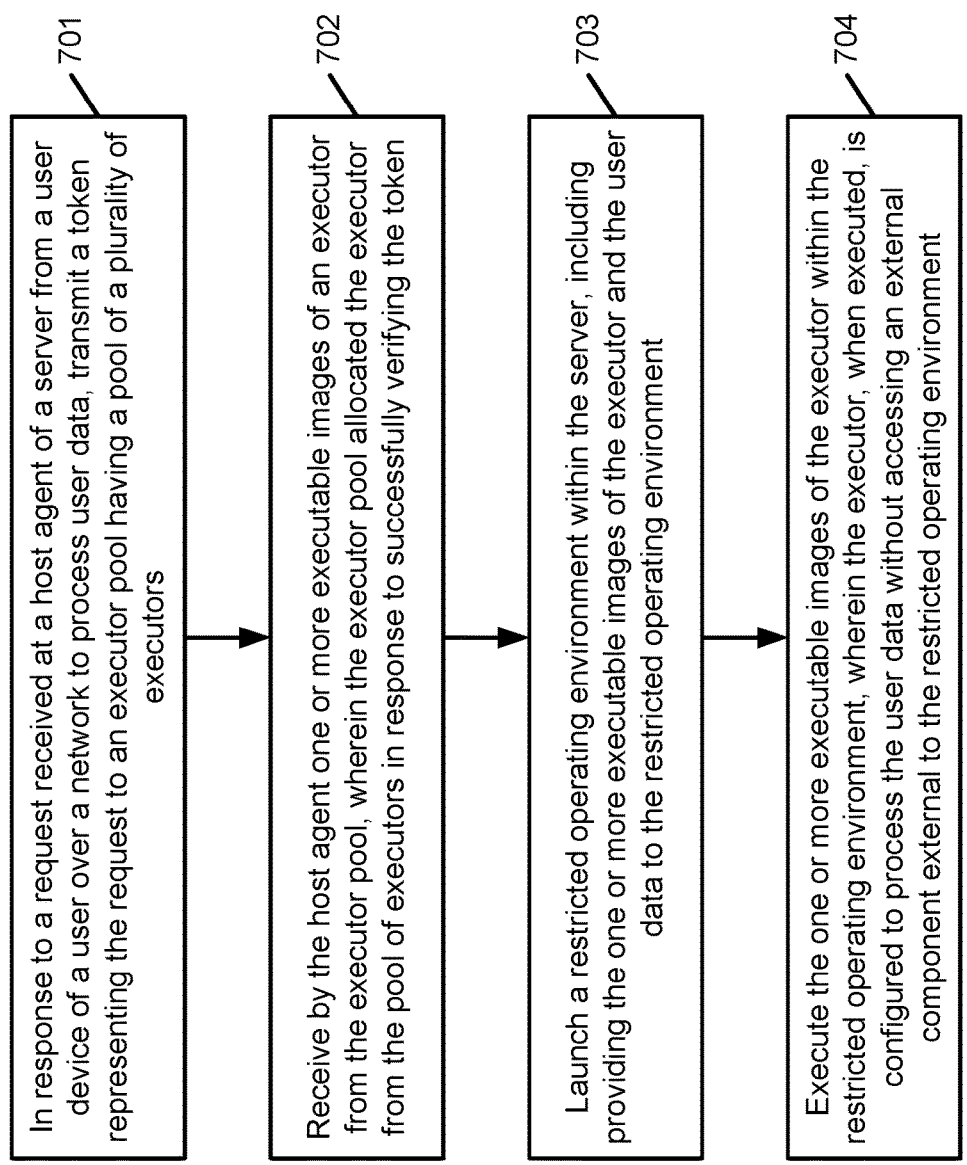
FIG. 7 is a flow diagram illustrating an example of a method according to one embodiment.

FIG. 7 is a flow diagram illustrating an example of a method according to one embodiment. Process 700 may be performed by processing logic which may include software, hardware, or a combination thereof. For example, process 700 may be performed by data processing server (e.g., host) 104 of FIG. 5. Referring to FIG. 7, at block 701, in response to a request received at a host agent of a server from a user device of a user over a network to process user data, processing logic transmits a token representing the request to an executor pool having a pool of a number of executors. At block 702, processing logic receives by the host agent one or more executable images of an executor from the executor pool, where the executor pool allocated the executor from the pool of executors in response to successfully verifying the token. At block 703, processing logic launches a restricted operating environment within the server, including providing the one or more executable images of the executor and the user data to the restricted operating environment. At block 704, processing logic executes the one or more executable images of the executor within the restricted operating environment, where the executor, when executed, is configured to process the user data without accessing an external component external to the restricted operating environment.

In one embodiment, the request is one of a number of requests received from a number of user devices associated with a number of users, and where each of the requests is processed within a respective one of a number of restricted operating environments. In one embodiment, processing logic further transmits a request identifier (ID) associated with the request and a user ID associated with the user from the host agent to a management service, and receives the token associated with the request from the management service in response to the request ID and the user ID.

In another embodiment, the management service registers the request ID and the user ID and generates the token to represent a service session associated with the request ID and the user ID. In another embodiment, the executor pool is configured to communicate with the management service to verify the token before sending the one or more executable images of the executor to the host agent. In another embodiment, the management service is to examine the token to determine whether the token is associated with the request ID and the user ID previously registered by the host agent.

In one embodiment, providing the one or more executable images of the executor and the user data includes storing the one or more executable images of the executor and the user data in a predetermined memory location of a memory accessible by the restricted operating environment. In another embodiment, the one or more executable images of the executor is retrieved from the predetermined memory location and executed within the restricted operating environment, and where the executor when executed is configured to process the user data retrieved from the predetermined memory location. In one embodiment, the executor is configured to generate a processing result of processing user data and to store the processing result in a predetermined memory location accessible by the host agent, and where the host agent is configured to retrieve the processing result from the predetermined memory location, return the processing result back to the user device, and terminate the restricted operating environment.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
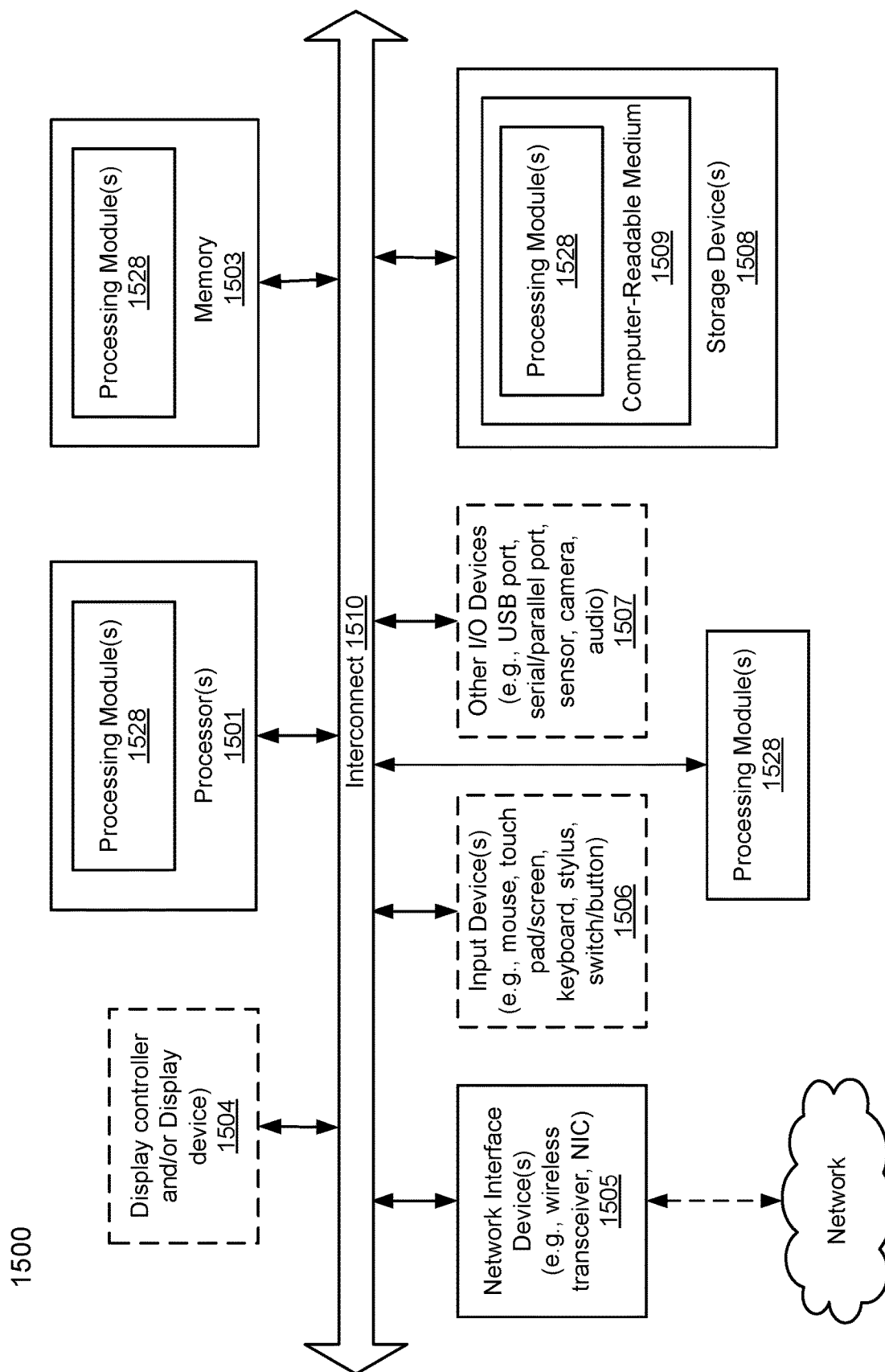
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, a client device or a server described above, such as, for example, clients 101-102, and server 104, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, host server 104 of FIG. 1 or FIG. 5, host agent 106 of FIG. 1 or FIG. 5, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing data in a trusted environment, the method comprising:
   in response to a request received at a host agent of a server from a user device of a user over a network to process user data, transmitting a token representing the request to an executor pool having a pool of a plurality of executors;
   receiving by the host agent one or more executable images of an executor from the executor pool, wherein the executor pool allocated the executor from the pool of executors in response to successfully verifying the token;
   launching a restricted operating environment within the server, including providing the one or more executable images of the executor and the user data to the restricted operating environment; and
   executing the one or more executable images of the executor within the restricted operating environment, wherein the executor, when executed, is configured to process the user data without accessing an external component external to the restricted operating environment.

2. The method of claim 1, wherein the request is one of a plurality of requests received from a plurality of user devices associated with a plurality of users, and wherein each of the requests is processed within a respective one of a plurality of restricted operating environments.

3. The method of claim 1, further comprising:
   transmitting a request identifier (ID) associated with the request and a user ID associated with the user from the host agent to a management service; and
   receiving the token associated with the request from the management service in response to the request ID and the user ID.

4. The method of claim 3, wherein the management service registers the request ID and the user ID and generates the token to represent a service session associated with the request ID and the user ID.

5. The method of claim 3, wherein the executor pool is configured to communicate with the management service to verify the token before sending the one or more executable images of the executor to the host agent.

6. The method of claim 5, wherein the management service is configured to examine the token to determine whether the token is associated with the request ID and the user ID previously registered by the host agent.

7. The method of claim 1, wherein providing the one or more executable images of the executor and the user data comprises storing the one or more executable images of the executor and the user data in a predetermined memory location of a memory accessible by the restricted operating environment.

8. The method of claim 7, wherein the one or more executable images of the executor is retrieved from the predetermined memory location and executed within the restricted operating environment, and wherein the executor when executed is configured to process the user data retrieved from the predetermined memory location.

9. The method of claim 1, wherein the executor is configured to generate a processing result of processing user data and to store the processing result in a predetermined memory location accessible by the host agent, and wherein the host agent is configured to retrieve the processing result from the predetermined memory location, return the processing result back to the user device, and terminate the restricted operating environment.

10. A non-transitory machine-readable medium having instructions stored therein, which when executed by a processor, cause the processor to perform operations, the operations comprising:
    in response to a request received at a host agent of a server from a user device of a user over a network to process user data, transmitting a token representing the request to an executor pool having a pool of a plurality of executors;
    receiving by the host agent an one or more executable images of an executor from the executor pool, wherein the executor pool allocated the executor from the pool of executors in response to successfully verifying the token;
    launching a restricted operating environment within the server, including providing the one or more executable images of the executor and the user data to the restricted operating environment; and
    executing the one or more executable images of the executor within the restricted operating environment, wherein the executor, when executed, is configured to process the user data without accessing an external component external to the restricted operating environment.

11. The non-transitory machine-readable medium of claim 10, wherein the request is one of a plurality of requests received from a plurality of user devices associated with a plurality of users, and wherein each of the requests is processed within a respective one of a plurality of restricted operating environments.

12. The non-transitory machine-readable medium of claim 10, further comprising:
transmitting a request identifier (ID) associated with the request and a user ID associated with the user from the host agent to a management service; and
receiving the token associated with the request from the management service in response to the request ID and the user ID.

13. The non-transitory machine-readable medium of claim 12, wherein the management service registers the request ID and the user ID and generates the token to represent a service session associated with the request ID and the user ID.

14. The non-transitory machine-readable medium of claim 12, wherein the executor pool is configured to communicate with the management service to verify the token before sending the one or more executable images of the executor to the host agent.

15. The non-transitory machine-readable medium of claim 14, wherein the management service is configured to examine the token to determine whether the token is associated with the request ID and the user ID previously registered by the host agent.

16. A data processing system, comprising:
a processor; and
a memory coupled to the processor to store instructions, which when executed by the processor, cause the processor to perform operations, the operations including
in response to a request received at a host agent of a server from a user device of a user over a network to process user data, transmitting a token representing the request and the user data to an executor pool having a pool of a plurality of executors;
receiving by the host agent an one or more executable images of an executor from the executor pool, wherein the executor pool allocated the executor from the pool of executors in response to successfully verifying the token;
launching a restricted operating environment within the server, including providing the one or more executable images of the executor and the user data to the restricted operating environment; and
executing the one or more executable images of the executor within the restricted operating environment by the host agent, wherein the executor, when executed, is configured to process the user data without accessing an external component external to the restricted operating environment.

17. The system of claim 16, wherein the request is one of a plurality of requests received from a plurality of user devices associated with a plurality of users, and wherein each of the requests is processed within a respective one of a plurality of restricted operating environments.

18. The system of claim 16, further comprising:
transmitting a request identifier (ID) associated with the request and a user ID associated with the user from the host agent to a management service; and
receiving the token associated with the request from the management service in response to the request ID and the user ID.

19. The system of claim 18, wherein the management service registers the request ID and the user ID and generates the token to represent a service session associated with the request ID and the user ID.

20. The system of claim 18, wherein the executor pool is configured to communicate with the management service to verify the token before sending the one or more executable images of the executor to the host agent.

21. The system of claim 20, wherein the management service is configured to examine the token to determine whether the token is associated with the request ID and the user ID previously registered by the host agent.

* * * * *